Nov. 8, 1966  E. C. WOOD  3,283,557

CLIP REMOVER

Filed June 24, 1964  2 Sheets-Sheet 1

INVENTOR
Ernest C. Wood
By McDougall, Hersh
and Scott
Att'ys

Nov. 8, 1966  E. C. WOOD  3,283,557
CLIP REMOVER

Filed June 24, 1964  2 Sheets-Sheet 2

INVENTOR
Ernest C. Wood
by McDougall, Hersh
and Scott
Attys

United States Patent Office 3,283,557
Patented Nov. 8, 1966

3,283,557
CLIP REMOVER
Ernest C. Wood, 2461 Ivanhoe Drive,
Los Angeles, Calif.
Filed June 24, 1964, Ser. No. 377,760
8 Claims. (Cl. 72—386)

This invention relates to the use of clips in the joinder of skin portions in the surgical treatment of skin and relates more particularly to a remover adapted for use in the removal of skin clips which have previously been applied.

In the copending applications, Serial No. 130,630, filed August 10, 1961, titled "Surgical Clip," now Patent No. 3,209,754, and Serial No. 176,632, filed March 1, 1962, titled "Single Clip Disposable Applicator," now Patent No. 3,150,379, description is made of skin clips, applicators and removers for use of clips instead of stitches in the bringing of skin portions together and for holding the skin portions together until the lesions and the like have healed.

As described in the aforementioned copending applications, the clips are in the form of U-shaped members c having a cross bail portion 10 and arm portions 12 and 14 extending forwardly in laterally spaced-apart relationship from the lateral edges of the bail portion 10. Spicules 16 extend inwardly and angularly downwardly from the end portion of the arms 12 and 14 for use in engagement with the skin.

The clip is preferably formed of a piece of sheet metal to define flat arms 12 and 14 and bail portion 10, as distinguished from round wire or the like. The bail portion may be of substantially uniform width throughout its length as illustrated in FIGURE 1, but it is preferred to form the bail 10 with a taper in its inner edge to provide a bail of lesser thickness at the center, thereby to define a central section of lesser strength.

In use, the clip is positioned with the spaced ends of the arms 12 and 14 on the surface of the skin 20 on opposite sides of the lesion 22. The ends of the arms are then pressed, as by means of a suitable applicator or tool, in the direction towards each other whereby the spicules 16 bite into the skin surface to anchor the arms as the arms are displaced in the direction towards each other. The engaged portions of the skin are concurrently displaced in the direction towards each other until the edges are brought together for healing. For the most part, the arms turn about the bail 10, with the center of the bail generally forming the pivot, as illustrated in FIGURE 4.

Very often, the pressure on the arms causes a bow to form in the bent portion of the bail, whereby the portions of the arms adjacent the bail are displaced a lesser amount in the direction towards each other, when in position of use.

In the copending applications, description is made of a remover in the form of a tweezers in which the ends of the tweezer arms are caused to spread in response to pressure. In use the ends of the tweezer arms are positioned between the spaced arms of the applied clip to cause spreading of the arms of the clip in response to pressure applied to the tweezer.

In most applications, the described remover is sufficient to spread the clip arms for removal of the clip from engagement with the skin. However, when the amount of skin taken by the bite between the arms 12 and 14 is extensive, or when the arms are closed too tightly to cause the skin to hump between the arms, or when the skin portion between the arms becomes inflamed, it becomes difficult properly to position the spreading members of the described clip remover between the clip arms for engagement therewith during the spreading operation. This of course raises a serious problem in the free use of the clips for skin closure, suturing and the like.

It is an object of this invention to produce a new and improved skin clip remover and it is a related object to produce a device of the type described which is simple in construction and easy in operation; which can be made available at low cost and which is formed of readily available materials; which operation positively engages the clip for removal without slippage or the like; which operation is to engage the bail of the clip to effect spreading of the arms thereby to enhance use thereof in the removal of skin clips independently of the amount of skin or condition of the skin clamped therebetween, and which is capable of use with clips formed of flat bail portions of uniform cross-section or bail portions of tapering cross-section or in which the clips may even be formed of wire members of relatively round cross-section.

These and other objects and advantages of this invention will hereinafter appear and, for purposes of illustration, but not of limitation, an embodiment of the inventment is shown in the accompanying drawings, in which.

Figure 5:
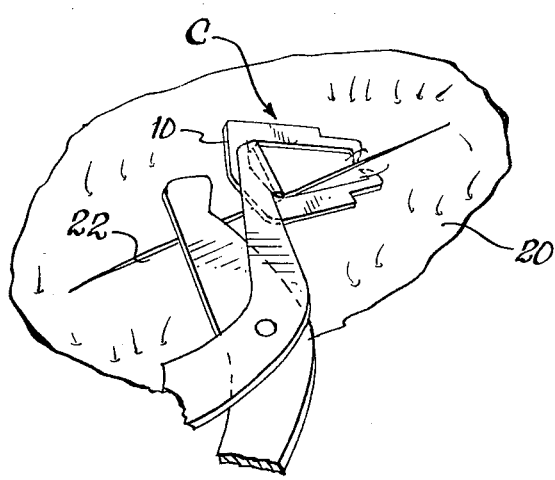
FIG. 5 is a perspective view showing the clip remover of FIG. 6 in position of use with applied clips of the type shown in FIGS. 1 or 2.

As illustrated in FIG. 5 of the drawing, the clip remover of this invention comprises a pair of elongate rod-like members 40 and 42 pivoted one on the other a short distance from one end to provide elongate handle arms 44 and 46 on one side of the pivot 48 and jaw members 50 and 52 on the opposite side of the pivot 48. The handle arms 44 and 46 are effective constantly to be urged in the direction away from each other, toward normal position, as by a leaf spring 54 positioned between the handle arms with one end 56 pivotally engaged in one handle arm 44 while the other end 58 is pivotally engaged in the other arm 46 with a spring coil 60 intermediate the ends.

The jaw portions 50 and 52 are angled with respect to the arms 44 and 46 with the jaw members preferably extending from the pivot 48 at an angle within the range of more than 45° up to about 90° with respect to the handle arms. The lower jaw member 50 is formed with an extension including a laterally extending portion 61 and an upwardly extending end portion 62 to define therebetween an upwardly facing cupped or grooved portion 64 dimensioned to have a length less than the length of the bail portion of the clip and a depth which can be greater than the width or thickness of the bail portion, but it is preferable that the dimension be less than the width thickness of the clip so as to receive the bail portion in seated relationship within the groove.

The other arm 52 is formed with a downwardly facing lip 66 preferably formed in its lower edge to V-shape, as illustrated by the numeral 68, with the apex 70 of the lip vertically aligned with about the center of the groove 64 and with the lip being formed with a recessed portion 72 extending lengthwise through the lower edge thereof with the base of the groove vertically aligned with the upturned end portion 62 of the other jaw to receive the upturned end portion therein when the jaws are displaced in the direction towards each other into engagement one with the other in operated position. In the preferred practice, the lip groove 72 is formed to V-shape in cross-section.

In normal position, the jaw members 50 and 52 are spaced apart by the resilient means 54 operately engaging the handle arms 44 and 46 and the jaws are adapted to be displaced in the direction towards each other responsive to actuation of the handle arms in the direction towards each other.

Figure 2:
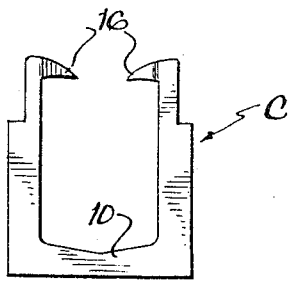
FIG. 2 is a plan view similar to that of FIG. 1 showing a modification in the skin clip.
Figure 3:
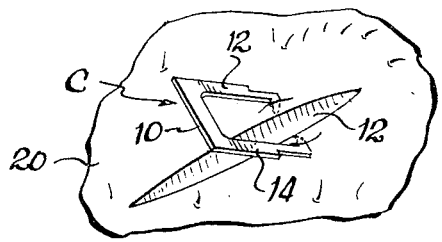
FIG. 3 is a perspective view showing the skin clip in original position for application to the skin.
Figure 4:
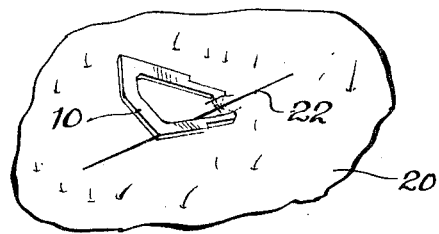
FIG. 4 is a perspective view similar to that of FIG. 3 showing the skin clip in clamping position.
Figure 6:
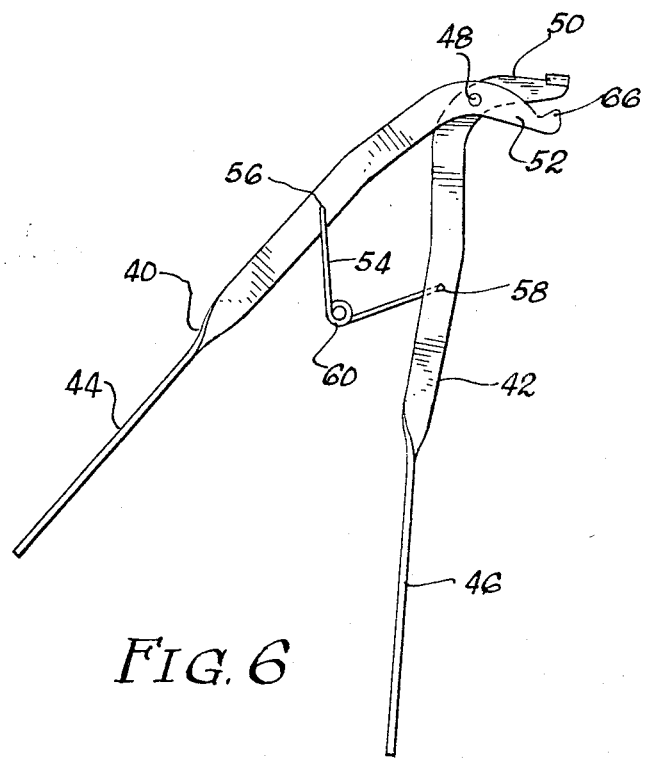
FIG. 6 is a perspective elevational view of the clip remover embodying the features of this invention.
Figure 7:
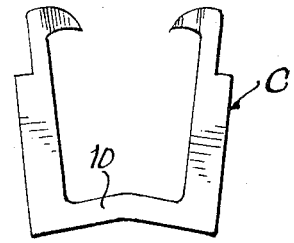
FIG. 7 is a diagrammatic view showing the spread of the clip of FIG. 1.
Figure 8:
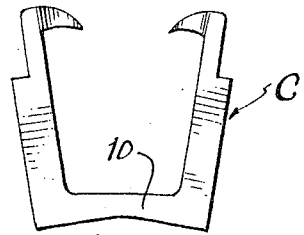
FIG. 8 is a diagrammatic view showing the spread of the clip of the type illustrated in FIG. 2.
Figure 9:
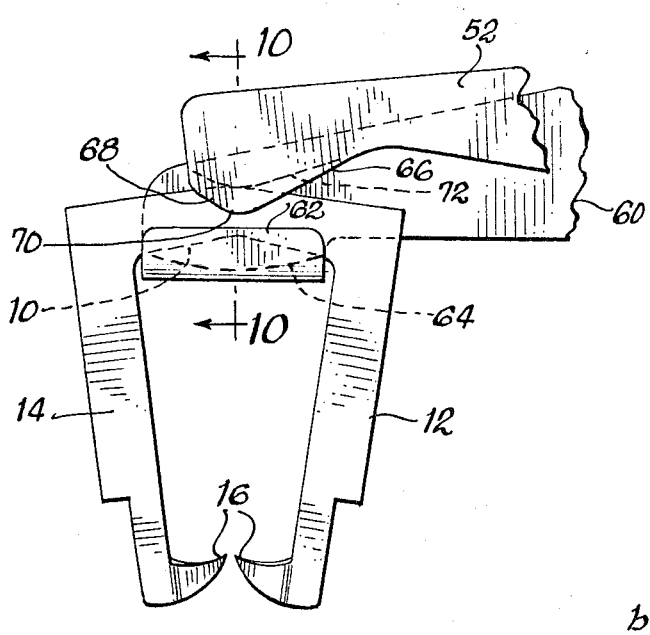
FIG. 9 is an enlarged fragmentary elevational view showing the elements in position at the time that the clip is engaged to effect spreading of the arms.
Figure 10:
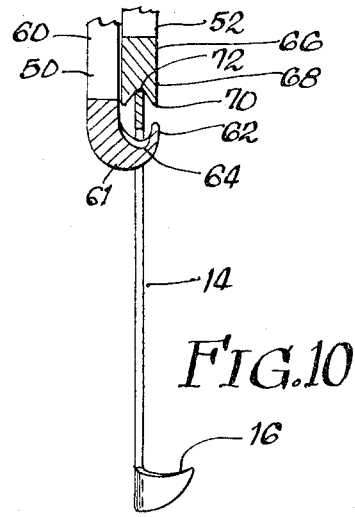
FIG. 10 is a sectional view taken along the line 10—10 of FIG. 9.

In use, the cup-shaped portion 64 on the end of the lower jaw 50 is positioned between the clip arms 12 and 14 adjacent the outer edge of the bail 10 to receive the bail portion in seated relationship therein. The handle arms 44 and 46 are thereafter displaced in the direction towards each other to bring the lip 66 into engagement wtih the opposite edge of the bail portion 10 with the edge of the bail seated within the groove 72. In this initial position, the central portion of the bail 10 is engaged between the elongate cupped member 64 along its outer edge and the lip 66. In response to continued displacement, the lip 66 presses the central portion of the bail 10 against the base of the groove 64 of the cup-shaped member whereby the bail portion is caused to be straightened out to cause the arms to spread, in response thereto, as illustrated in FIGS. 6 and 7. When the spring clip is formed with a tapered bail, as in FIG. 2, the pressure of the lip on the back edge of the bail to align the front edge of the bail with the base of the groove will operate to cause the arms to spread apart by an amount even greater than that of the original clip thereby to insure complete release of the skin.

The clip will remain clamped between the jaws of the clip remover to enable the clip to be removed by the clamp after the arms have been spread sufficiently to disengage the spicules from the skin. Thus, the clip is positively engaged during removal to permit displacement without the need to touch the clip or the skin. It will be apparent also that, for removal, the clip is engaged at the bail portion which is the portion farthest removed from the spicules and from the skin portion that is engaged between the ends of the clip arms thereby to make an engagement with the clip for removal, substantially completely independent of the amount of skin engaged in the arms, the amount of displacement of the arms to clamping position, or the condition of the skin therebetween. Engagement of the clip at the bail portion for removal also insures full access for removal of the clip since very little, if any, narrowing of the spaced relationship between the arms occurs adjacent the bail portion, thereby to insure a sufficiently spaced relationship to enable the lower jaw portion to be properly inserted beneath the outer edge of the bail.

The grooved arrangement in the jaw extension also provides flexibility in the use of the clip remover for proper engagement of the clip bail even when the bail portion becomes bowed during application to the skin.

Figure 1:
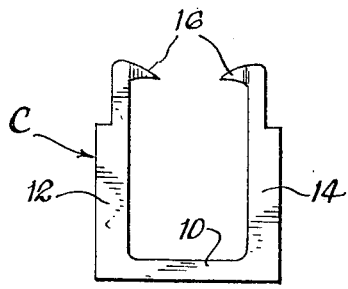
FIG. 1 is a schematic plan view of one form of skin clip with which the remover of this invention is adapted to be employed.

It will be further apparent that the base and groove in the lower jaw of the clip remover may itself be formed with a taper extending from the lateral edges to the center to effect bending movement of the bail portion of the clip member beyond its original position to effect even greater spread of the arms, even when formed of a flat bail, as in FIG. 1.

The angle that the jaw members make with the handle portions can be varied for greatest convenience in use. When formed in an angle of 60° to 90°, it will be apparent that the jaw portions will become horizontally disposed, while the handle portions extend upwardly for greatest convenience in use. This arrangement also makes the jaw portions more accessible visually for placement and use. The angular relationship can be varied consistent with use to be made and for greater visibility with the operated end for clip engagement.

It will be understood that changes may be made in the details of construction, arrangement and operation of the clip remover, without departing from the spirit of the invention, especially as defined in the following claims.

I claim:

1. A device for the removal of clips formed of a bail portion, a spaced pair of elongate arms extending forwardly from the bail portion and spicules extending inwardly from the forward end portions of the arms and wherein the arms are displayed inwardly in the direction towards each other at their forward end in position of use, said clip remover comprising a pair of elongate arms pivoted intermediate their ends to provide handle portions on one side of the pivot and jaw members on the other side of the pivot movable in the direction toward and away from each other responsive to movement of the handle portions about the pivot, one of said jaw members having a portion extending laterally and upwardly to provide a recessed portion dimensioned to have a length less than the bail portion of the clip, the other of said jaw members having a lip extending in the direction toward the recessed portion and in alignment therewith for movement into and out of said recessed portion during movement of the jaw members in the direction toward and away from each other, said lip being normally spaced from the recessed portion by an amount greater than the width of the bail portion of the clip to enable the bail portion of the clip to be received in the recessed portion for engagement on opposite sides of said bail portion to spread the arms responsive to movement of the jaw members in the direction toward each other.

2. A device as claimed in claim 1 which includes means constantly urging the jaw members towards normal position in the direction away from each other to space the recessed portion and lip by an amount greater than the width of the bail portion of the clip.

3. A device as claimed in claim 1 which includes means for stopping the jaw members in normal open position.

4. A device as claimed in claim 1 in which the jaw members extend angularly from the handle portions.

5. A device as claimed in claim 4 in which the jaw members extend at an angle of 45° to 90° with respect to the handle members.

6. A device as claimed in claim 1 in which the upwardly extending portion of the extension in the one jaw member is spaced from the jaw member by an amount slightly greater than the thickness of the bail of the clip.

7. A device as claimed in claim 1 in which the lip on the other jaw member is shaped to V-shaped with the apex of the V extending in the direction away from the recessed portion.

8. A device as claimed in claim 1 in which the lip is formed with an elongate groove extending lengthwise through the central portion thereof and dimensioned to have a width greater than the thickness of the bail portion of the clip member to receive the edge of the bail portion therein when the jaw members are displaced in the direction towards each other to engaging position to engage the opposite edges of the bail between the recessed portion in the one jaw member and the grooved portion in the other jaw member.

References Cited by the Examiner

UNITED STATES PATENTS

| | | | |
|---|---|---|---|
| 499,637 | 6/1893 | Knight | 254—28 |
| 732,501 | 6/1903 | Baker | 72—409 |
| 2,723,577 | 11/1955 | Shank | 72—409 |
| 2,887,110 | 5/1959 | Roeschmann | 128—321 |

CHARLES W. LANHAM, *Primary Examiner.*

G. P. CROSBY, *Assistant Examiner.*